United States Patent Office 3,307,241
Patented Mar. 7, 1967

3,307,241
PROCESS FOR MAKING CATHODES
Paul Wythe Crapuchettes, Atherton, Calif., assignor to Litton Precision Products, Inc., San Carlos, Calif.
No Drawing. Filed Oct. 14, 1963, Ser. No. 316,176
3 Claims. (Cl. 29—25.17)

This invention relates to electron discharge devices, and, more particularly, to an improved process for making cathodes for electron discharge devices.

There is a type of indirectly heated cathode known as a dispenser cathode which is useful in certain types of electron discharge devices, such as magnetrons. The prior art method of manufacturing dispenser cathodes has been as follows:

Powdered tungsten is sintered in a hydrogen atmosphere into a matrix. Copper is then infused into the matrix. The sintered mass is machined to the desired shape of the cathode and is vacuum-fired to evaporate the copper binder and any impurities from the cathode so as to leave a tungsten matrix. The cathode is next impregnated with a suitable electron emitting substance, and is ready to be inserted in the electron discharge device. A suitable electron emitting substance may be a mixture of 5 moles of barium carbonate ($BaCO_3$), 2 moles of alumina ($Al_2O_3$) and 3 moles of calcium carbonate ($CaCO_3$). This mixture may be impregnated into the previously prepared cathode and fired in a hydrogen atmosphere, with the mixture becoming essentially barium aluminate.

While such a process results in a satisfactory dispenser cathode, it has been found that the process is expensive, obviously resulting in an expensive cathode, which increases the final cost of producing an electron discharge device employing these cathodes.

It is accordingly an object of this invention to provide an improved process for preparing cathodes for electron discharge devices.

It is another object of this invention to provide an improved process for preparing dispenser cathodes for electron discharge devices.

It is yet another object of this invention to provide an inexpensive process for preparing dispenser cathodes for electron discharge devices.

In accordance with the present invention, a dispenser cathode is prepared in the following manner:

A base having dimensions approximately equal to the dimensions of the cathode which it is desired to prepare is formed from a suitably non-reactive or non-poisoning base material. The important properties of the base are its strength at high temperatures and its chemical inertness. For example, the base may be prepared by drawing it from a thin sheet of refractory metal such as molybdenum coated with a thin layer of nickel or other inert substance to prevent formation of barium molybdate or other generic poisons. Tungsten powder, or any other suitable material, such as a mixture of powdered tungsten and powdered nickel, is then flame-sprayed onto the outer surface of the base to form a suitable matrix on the base. The sprayed base is then vacuum-fired to clean up any impurities in the materials. The matrix of the cathode so prepared may then be impregnated with an electron emitting substance in any suitable manner, such as the one described above in connection with the prior art method of preparing dispenser cathodes, but it is understood that any suitable emitting substance may be used, and that the particular substance chosen forms no part of the present invention.

In a specific example, a dispenser cathode for a magnetron may be prepared by drawing a base cup from a molybdenum sheet having a thickness of 0.010". The diameter of the drawn cup may be 0.550" and the length of the drawn cup 0.600". A thin coat of nickel (.0001") is applied and sintered. Tungsten powder is flame-sprayed onto the outer surface of the cup to a thickness of 0.050". The flame-sprayed cup is vacuum-fired at 1700° C. to clean up any impurities in the tungsten matrix. The cathode is then impregnated with a mixture of 5 moles of barium carbonate, 2 moles of alumina and 3 moles of calcium carbonate fired in a hydrogen atmosphere at a temperature of about 1600° C.

It is to be understood that the above described arrangements are merely illustrative of the application of the principles of the present invention. Numerous other arrangements within the scope of the invention may be derived by those skilled in the art. Accordingly, from the foregoing, it is evident that various changes may be made in the present invention without departing from the spirit of the invention as defined in the appended claims.

What is claimed is:

1. The process for preparing a cathode for an electron discharge device which comprises the steps of drawing a refractory metal cup having external dimensions at at least its emitting portions slightly smaller than the cathode to be prepared, flame-spraying a matrix of tungsten on said cup in such amounts as to bring the cathode up to size, vacuum-firing said sprayed cup to remove any impurities from said tungsten, and impregnating said tungsten matrix with an electron emitting substance.

2. The process for preparing a cathode for an electron discharge device which comprises the steps of drawing from a molybdenum sheet a cup having external dimensions at at least its emitting portions slightly smaller than the cathode to be prepared, coating said cup with a thin film of nickel, flame-spraying a matrix of tungsten onto the external surface of said cup in such amount as to bring the cathode up to size, vacuum-firing said sprayed cup to remove any impurities from said tungsten, and impregnating said tungsten with a mixture of 5 moles of $BaCO_3$, 2 moles of $Al_2O_3$ and 3 moles of $CaCO_3$.

3. The process for preparing a cathode for an electron discharge device which comprises the steps of drawing from a molybdenum sheet a cup having external dimensions at at least its emitting portions slightly smaller than the cathode to be prepared, flame-spraying a coating of tungsten onto the external surface of said cup in such amounts as to bring the cathode up to size, thereby forming a tungsten matrix on said cup, vacuum-firing said coated cup at a temperature of about 1700° C. to remove any impurities from said tungsten, and impregnating said tungsten with a mixture of 5 moles of $BaCO_3$, 2 moles of $Al_2O_3$ and 3 moles of $CaCO_3$ in a hydrogen atmosphere at about 1600° C.

References Cited by the Examiner

UNITED STATES PATENTS

| | | | |
|---|---|---|---|
| 2,566,115 | 8/1951 | Bounds | 313—346 X |
| 2,912,611 | 11/1959 | Beck | 313—346.1 |
| 3,005,926 | 10/1961 | Horner | 313—346 X |
| 3,016,472 | 1/1962 | Coppola | 313—346.1 |
| 3,045,320 | 7/1962 | Apelbaum | 29—25.18 |
| 3,082,516 | 3/1963 | Rudness | 29—528 |
| 3,101,531 | 8/1963 | Roseberry | 29—474.4 |
| 3,113,370 | 12/1963 | Lerman | 29—25.17 |
| 3,201,639 | 8/1965 | Levi | 313—346 |

JOHN F. CAMPBELL, *Primary Examiner.*

WHITMORE A. WILTZ, *Examiner.*

W. I. BROOKS, *Assistant Examiner.*